United States Patent
Ochi et al.

(10) Patent No.: US 12,473,520 B2
(45) Date of Patent: Nov. 18, 2025

(54) CONTAINERIZED ALCOHOLIC BEVERAGE

(71) Applicant: SUNTORY HOLDINGS LIMITED, Osaka (JP)

(72) Inventors: Naoko Ochi, Kanagawa (JP); Kazuki Yoshihara, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 386 days.

(21) Appl. No.: 17/765,014

(22) PCT Filed: Sep. 9, 2020

(86) PCT No.: PCT/JP2020/034036
§ 371 (c)(1),
(2) Date: Mar. 30, 2022

(87) PCT Pub. No.: WO2021/065387
PCT Pub. Date: Apr. 8, 2021

(65) Prior Publication Data
US 2022/0411730 A1   Dec. 29, 2022

(30) Foreign Application Priority Data
Oct. 2, 2019 (JP) .................................. 2019-181831

(51) Int. Cl.
*C12G 3/06* (2006.01)
*B65D 85/72* (2006.01)

(52) U.S. Cl.
CPC .............. *C12G 3/06* (2013.01); *B65D 85/72* (2013.01)

(58) Field of Classification Search
CPC .. C12G 3/04; C12G 3/06; A23L 27/84; B65D 85/72
USPC ........................................................ 426/592
See application file for complete search history.

(56) References Cited

U.S. PATENT DOCUMENTS

2005/0220935 A1  10/2005  Oono

FOREIGN PATENT DOCUMENTS

| JP | H10-313849 A | 12/1998 |
|---|---|---|
| JP | 2003-204779 A | 7/2003 |
| JP | 2003-289824 A | 10/2003 |
| JP | 2014-140352 A | 8/2014 |
| JP | 2015-128409 A | 7/2015 |
| JP | 2019-170174 A | 10/2019 |
| JP | 2019-216689 A | 12/2019 |
| WO | 2004/000990 A1 | 12/2003 |
| WO | 2014/104408 A1 | 7/2014 |

OTHER PUBLICATIONS

International Search Report dated Nov. 10, 2020, issued in counterpart Application No. PCT/JP2020/034036. (2 pages).

*Primary Examiner* — Subbalakshmi Prakash
(74) *Attorney, Agent, or Firm* — WHDA, LLP

(57) ABSTRACT

An object of the present invention is to improve a sensation of piquant pungency of a packaged alcoholic beverage without a significant effect on the aroma of the beverage. By adding from 1.0 to 50 ppm of *Yucca* saponin to an alcoholic beverage with an alcohol content of from 1 to 9.5 v/v %, a sensation of alcohol pungency in a packaged alcoholic beverage can be reduced.

12 Claims, No Drawings

CONTAINERIZED ALCOHOLIC BEVERAGE

TECHNICAL FIELD

The present invention relates to a packaged alcoholic beverage and a method for producing the same. More particularly, this invention relates to an alcoholic beverage having a reduced sensation of piquant pungency while retaining its clean aroma.

BACKGROUND ART

In recent years, low-alcohol beverages typified by shochu-based cocktails have been increasingly consumed instead of beer-flavored alcoholic beverages such as beers and low-malt beers. Among such shochu-based cocktails, those with a lower alcohol content and a mild quality are becoming increasingly popular.

A possible reason for this change in consumer needs may be that consumers may dislike and avoid the bitterness of hops used in beer-flavored alcoholic beverages, and the sensation of pungency caused by the pungent odor and bitterness of an alcohol present in low-alcohol beverages such as shochu-based cocktails.

Under these circumstances, one of the challenges faced by the liquor industry is to provide mild and easy-to-drink alcoholic beverages, in which a sensation of pungency or a pungent odor of alcoholic beverages is reduced, with a view to maintaining and increasing the consumption of liquors. In particular, many consumers mainly including young people are prominently getting uninterested in drinking liquors, and thus, a rapid solution to address the situation is needed.

Various attempts have been made to reduce or eliminate the pungency derived from an alcohol. For example, PTL 1 discloses a method for improving the taste and aftertaste of an alcoholic beverage through eliminating the unpleasant odor of the alcoholic beverage with addition of a fruit of paradicsom paprika. PTL 2 discloses a method for making an alcohol-containing beverage or food taste mild through alleviating the alcohol odor and pungency of the beverage or food by adding to the beverage or food a glucan having a degree of polymerization of not less than 50 and containing an internally branched cyclic structural segment and an externally branched cyclic structural segment. PTL 3 discloses a method for improving the pungent odor of an alcohol-containing beverage or food through addition of betaine, which is an amino acid.

CITATION LIST

Patent Literatures

PTL 1: Japanese Unexamined Patent Application Publication No. JP H10-313849
PTL 2: Japanese Unexamined Patent Application Publication No. JP 2003-289824
PTL 3: Japanese Unexamined Patent Application Publication No. JP 2003-204779

SUMMARY OF INVENTION

Technical Problem

All of the techniques disclosed in the aforementioned prior art references aim at reducing pungent alcohol odor or the like through addition of a special taste substance. Such masking of alcohol pungency with addition of a taste component has a not insignificant impact on the taste and aroma of beverages. It is not much preferable to add even the slightest aroma to a beverage, since the addition of aroma may disrupt a delicate balance in product design quality, leading to unexpected change in aroma.

Also, there are cases where a strong pungent alcohol odor is felt when packaged alcoholic beverages like canned beverages are opened. In such packaged alcoholic beverages, a technique for effectively reducing piquant alcohol odor is demanded.

In view of these circumstances, an object of the present invention is to provide a technique that can reduce the pungent alcohol odor of a packaged alcoholic beverage while allowing the beverage to retain its clean aroma.

Solution to Problem

The present inventors have made intensive studies to achieve the aforementioned object, and as a result, found that, by adding a *Yucca* extract, a naturally occurring ingredient, to a packaged alcoholic beverage, pungent alcohol odor can be effectively reduced without a significant effect on the aroma of the alcoholic beverage.

The present invention includes, but is not limited to, the following embodiments.

(1) A packaged alcoholic beverage comprising a *Yucca* extract, wherein the beverage has a *Yucca* saponin content of from 1.0 to 50 ppm and an alcohol content of from 1 to 9.5 v/v %.
(2) The beverage as set forth in (1), wherein the beverage is an unheated packaged alcoholic beverage.
(3) The beverage as set forth in (1) or (2), wherein the beverage has a *Yucca* saponin content of not more than 20 ppm.
(4) The beverage as set forth in any of (1) to (3), wherein the beverage contains one or more types selected from citric acid, sodium citrate, malic acid, and lactic acid.
(5) A method for producing a packaged alcoholic beverage, the method comprising the step of preparing an alcoholic beverage having a *Yucca* saponin content of from 1.0 to 50 ppm and an alcohol content of from 1 to 9.5 v/v %.
(6) A method for reducing a sensation of alcohol pungency in a packaged alcoholic beverage, the method comprising the step of adding a *Yucca* extract to an alcoholic beverage having an alcohol content of from 1 to 9.5 v/v % so as to give a *Yucca* saponin content of from 1.0 to 50 ppm.

Advantageous Effects of Invention

According to the present invention, by adding *Yucca* saponin, a naturally occurring ingredient, to a packaged alcoholic beverage, a sensation of piquant pungency derived from an alcohol can be effectively improved while the beverage is allowed to retain its clean aroma.

DESCRIPTION OF EMBODIMENTS

Packaged Alcoholic Beverage
The present invention is directed to a packaged alcoholic beverage. The type of an alcohol that can be used in this invention is not particularly limited. Any of brewages or distilled liquors may be used alone or in combination with each other. Examples of alcohols that can be used include: brewer's alcohols, spirits (e.g., refined spirits such as gin, vodka, rum, tequila and new spirits, and feedstock alcohols), liqueurs, whiskeys (e.g., whiskey, brandy), and shochu (continuous distilled shochu (so-called "Ko-type shochu") and single distilled shochu (so-called "Otsu-type shochu"), with further examples being brewages such as refined sake, wine, and beer. Inter alia, some types of distilled liquors are stronger in pungent alcohol odor than brewages. Thus, it is preferable to apply this invention to a beverage containing a distilled liquor, since the effect of this invention can be effectively obtained.

The alcoholic beverage of the present invention has an alcohol content of from 1 v/v % to 9.5 v/v %. In this invention, the alcohol content of the alcoholic beverage is in the range of preferably from 2.0 v/v % to 9.2 v/v %, more preferably from 3.0 v/v % to 8.9 v/v %, or may be in the range of from 4.0 v/v % to 8.7 v/v %. The alcohol content of the alcoholic beverage can be measured by, for example, a vibrational densimeter. In order to measure alcohol content, a sample is distilled under direct fire, and then, the density at 15° C. of the resulting distillate is measured and converted to an alcohol content according to Table 2 "Conversion among Alcohol Content, Density (15° C.) and Specific Gravity (15/15° C.)" which is annexed to the Official Analysis Method of the National Tax Agency in Japan (National Tax Agency Directive No. 6 in 2007, revised on Jun. 22, 2007).

The alcoholic beverage of the present invention is a packaged beverage, which is a beverage packed in a package. The form of a package is not limited in any way, and the package can be provided in any commonly used forms such as glass bottles, plastic-based molded packages, metal cans, and laminated paper packages with a metal foil or plastic film laminated thereon.

The beverage of the present invention may have carbon dioxide gas incorporated therein. Incorporation of carbon dioxide gas enhances the clean sensation of a beverage. Carbon dioxide gas can be incorporated in a beverage using a method commonly known to skilled artisans. Examples of such commonly known methods include, but are not limited to, the following: carbon dioxide may be dissolved in a beverage under pressure; carbon dioxide and a beverage may be mixed in piping using a mixer such as a carbonator produced by Tuchenhagen GmbH; a beverage may be sprayed into a tank filled with carbon dioxide to cause the beverage to absorb carbon dioxide; or a beverage may be mixed with carbonic water. Any of such means is used, as appropriate, to adjust the pressure of carbon dioxide gas.

The pressure of carbon dioxide gas to be incorporated in the beverage of the present invention is not particularly limited, and is, for example, not less than 0.8 kgf/cm$^2$, and is preferably in the range of from 1.2 to 3.1 kgf/cm$^2$, at a beverage temperature of 20° C. Exemplary forms of the inventive beverage having carbon dioxide gas incorporated therein include so-called "Chu-hi", which is a shochu-based cocktail. Carbon dioxide gas pressure can be measured by a method known to skilled artisans—for example, using a gas volume analyzer (e.g., GVA-500A, produced by Kyoto Electronics Manufacturing Co., Ltd.). More specifically, with the beverage temperature being adjusted to 20° C., a packaged beverage placed in the aforementioned gas volume analyzer is subjected to gas venting (snifting), followed by resealing and shaking, and then measured for carbon dioxide gas pressure. Unless otherwise specified herein, the carbon dioxide gas pressure refers to a carbon dioxide gas pressure at a beverage temperature of 20° C.

Yucca Extract

The beverage of the present invention comprises a Yucca extract. As referred to herein, the term "Yucca" refers to a plant belonging to the family Agavaceae, the genus Yucca. The species of a plant belonging to the family Agavaceae, the genus Yucca is not particularly limited, and for example, from the viewpoint of relatively easy obtainability, or the like, Yucca arizonica, Yucca brevifolia, Yucca elata, Yucca intermdia, Yucca mohavensis, Yucca schidigera (Mojave yucca), Yucca peninsularis, Yucca schottii, Yucca whipplei, and the like are preferred, with Yucca schidigera (Mojave yucca) and Yucca brevifolia being particularly preferred.

The site of Yucca to be used as a source material to make a Yucca extract in the present invention is not particularly limited, and at least both of the underground part and the aboveground part (including seeds) of Yucca can be used as a source material for extraction. The source material for extraction is pulverized, either raw or after drying, to a proper size, and then extracted with water, a hydrophilic organic solvent or a mixed solvent thereof.

Examples of water that can be used as an extraction solvent include pure water, tap water, well water, cold spring water, mineralized water, hot spring water, spring water, fresh water, and those waters treated by different procedures. Exemplary procedures for treating water include purification, heating, disinfection, sterilization, filtration, ion exchange, osmotic pressure regulation, buffering, and the like. Therefore, examples of water that can be used as an extraction solvent in the present invention also include purified water, hot water, ion-exchanged water, physiological saline, phosphate buffer, phosphate buffered saline, and the like.

The type of a hydrophilic organic solvent is not particularly limited, and can be selected as appropriate depending on the intended purpose. Examples of hydrophilic organic solvents include, but are not limited to: lower alcohols having 1 to 5 carbon atoms, such as methanol, ethanol, propyl alcohol, and isopropyl alcohol; lower aliphatic ketones such as acetone and methyl ethyl ketone; and polyhydric alcohols having 2 to 5 carbon atoms, such as 1,3-butylene glycol, propylene glycol, isopropylene glycol, and glycerol. Mixed solvents of such a hydrophilic organic solvent and water can also be used. In the case of using a mixed solvent of water and a hydrophilic organic solvent, it is preferable to add 1 to 90 parts by mass of a lower alcohol to 10 parts by mass of water, or to add 1 to 40 parts by mass of a lower aliphatic ketone to 10 parts by mass of water, or to add 1 to 90 parts by mass of a polyhydric alcohol to 10 parts by mass of water.

The extraction procedure for a Yucca extract is not particularly limited, and can be selected as appropriate depending on the intended purpose. For example, by immersing Yucca in a solvent maintained at ambient temperatures or at a temperature close to its boiling point, active components can be efficiently extracted. In a preferred embodiment, a liquid extract can be obtained by performing extraction treatment of a source material for extraction to elute soluble components from the source material, and then performing filtration to remove extraction residues. The obtained liquid extract may be further treated by dilution, concentration, drying, purification, or the like according to a common procedure in order to obtain a dilution or liquid concentrate of said liquid extract, a dried product of said liquid extract, or a crude purified product or a purified product of any of the above products. The further treatments by purification, or the like can be performed specifically with the use of activated carbon, adsorption resins, ion-exchange resins, or the like.

The steroidal saponin content of the Yucca extract of the present invention is not particularly limited, and is preferably in the range of from 0.5 to 10% by mass, more preferably from 0.5 to 3% by mass. The Yucca extract contains saponin, which is a glycoside composed of sapogenin and a sugar. The amount of the *Yucca* extract added can be determined using saponin content as an index. In this invention, the *Yucca* extract is added to an alcoholic beverage so as to give a content of *Yucca*-derived saponin (*Yucca* saponin) of from 1.0 to 50 ppm. In a preferred embodiment, the *Yucca* saponin content in the beverage is in the range of from 1.5 to 40 ppm, preferably from 2.0 to 30 ppm, or may also be in the range of from 3.0 to 20 ppm.

*Yucca* saponin contained in the beverage can be quantified according to a known procedure—e.g., the procedure specified in Japan's specifications and standards for food additives. To be specific, *Yucca* saponin can be quantified according to the procedure detailed below.

(a) 0.2 g of a sample is dissolved in 5 mL of water and poured into a glass tube that has been filled with 20 mL of a styrene-divinylbenzene adsorption resin.

(b) The content is washed with 100 mL of water and 100 mL of a methanol/water (3:2) mixed solution in this order at a flow rate of not more than 2 mL per minute, and then eluted with 100 mL of a methanol/water (9:1) mixed solution.

(c) After elution, the solvent is distilled off, and the residues are dissolved in ethanol (95) to make exactly 20 mL. 10 mL of the solution is weighed out, 10 mL of a hydrochloric acid reagent (2 mol/L) is added to the solution, and the mixture is heated for 3 hours in a water bath equipped with a reflux condenser.

(d) After cooling, the mixture is extracted twice with 80 mL of diethyl ether, and the combined diethyl ether phase is washed with 20 mL of water, dehydrated with addition of 20 g of sodium sulfate, and evaporated to distill off diethyl ether.

(e) The residues are dissolved in ethyl acetate to make exactly 50 mL (solution A), and ethyl acetate is added to 1 mL of solution A to make 10 mL (test solution).

(f) A quantitative standard of sarsasapogenin is weighed out in an amount of 5 mg on an anhydrous basis, and dissolved in ethyl acetate to make 5 mL (solution B). Ethyl acetate is added to 1 mL of solution B to make 200 mL (standard solution).

(g) As a blank solution, ethyl acetate is used.

(h) 2 mL each of the test solution, standard solution, and blank solution are weighed out, and 1 mL each of a 0.5% 4-methoxybenzaldehyde/ethyl acetate reagent solution and a sulfuric acid/ethyl acetate mixed solution (1:1) are added to each solution. Each mixture is stirred by gentle shaking in a water bath at 60° C. for 10 minutes.

(i) After cooling in a water bath at room temperatures for 10 minutes, each mixture is measured for absorbance at 430 nm using ethyl acetate as a control.

(j) The content of *Yucca* saponin is calculated from the equation indicated below. $A_T$ represents the absorbance of a test solution, $A_S$ represents the absorbance of a standard solution, and $A_0$ represents the absorbance of a blank solution.

$$\frac{\text{Collected amount of sarsasapogenin (g)}}{\text{Collected amount of sample on an anhydrous basis (g)}} \times \frac{A_T - A_0}{A_S - A_0} \times 2.10 \times 100 \quad \text{[Chem. 1]}$$

In the present invention, the *Yucca* extract can be added at a suitable step during the process of production of beverages. Exemplary addition procedures include, but are not limited to, preliminary addition of a *Yucca* extract to a source ingredient, addition of a *Yucca* extract during the step of mixing source ingredients, and addition of a *Yucca* extract after dissolution of mixed ingredients in water. When the beverage is subjected to sterilization treatment, addition of a *Yucca* extract may be carried out before or after the step of sterilizing the beverage.

Other Components, and the Like

Similarly to common beverages, the beverage of the present invention may have different additives added thereto to the extent that they do not impair the effects of this invention. Examples of different additives include, but are not limited to, acidulants, flavorings, vitamins, pigments, antioxidants, emulsifiers, preservatives, seasonings, essences, pH adjustors, thickeners, and quality stabilizers.

The alcoholic beverage of the present invention can be made into, for example, a citrus alcoholic beverage by addition of a flavoring and/or a fruit juice. As referred to above, the "citrus alcoholic beverage" refers to a beverage having a citrus fruit aroma, or in other words, a beverage having an aroma reminiscent of a citrus fruit upon drinking. Examples of citrus fruits include, but are not limited to: oranges (*Citrus sinensis*) such as Valencia orange and navel orange; various varieties of grapefruits; acid citrus fruits such as lemon, lime, flat lemon (*Citrus depressa*), bitter orange (*Citrus aurantium*), yuzu (*Citrus junos*), kabosu (*Citrus sphaerocarpa*), sudachi (*Citrus sudachi*), citron, and fingered (Buddha's hand) citron (*Citrus medica* var. *sarcodactylis*); miscellaneous citrus fruits such as natsudaidai orange (*Citrus natsudaidai*), hassaku orange (*Citrus hassaku*), hyuganatsu orange (*Citrus tamurana*), oroblanco (sweetie), and shiranuhi (dekopon); tangors such as iyokan orange (*Citrus iyo*) and tankan orange (*Citrus tankan*); satsuma oranges such as mandarin orange, unshiu orange (*Citrus unchiu*), ponkan (*Citrus reticulata* var. *poonensis*) and kishu mandarin (*Citrus kinokuni*); and kumquats such as Japanese kinkan.

Examples of a beverage having a citrus fruit aroma include, but are not limited to, beverages containing a citrus fruit pulp and/or juice, and beverages made of part of a citrus fruit itself. Also, the beverage having a citrus fruit aroma may contain no fruit juice as long as it gives off a citrus fruit aroma. Examples of such beverages containing no fruit juice include those containing an aroma component-containing essence extracted from a citrus fruit, and those containing a flavoring that artificially replicates an aroma component characteristic of a citrus fruit.

When a fruit juice is added to the alcoholic beverage of the present invention, the amount of a fruit juice added is not particularly limited, and is in the range of preferably from 0.01 to 30%, or may be in the range of from 0.1 to 20%, from 0.5 to 10%, or from 1 to 5%, in terms of straight fruit juice. With regard to the type of a fruit juice, the fruit juice can be of any forms, including a straight fruit juice used as freshly squeezed from a fruit, or a concentrated fruit juice obtained by concentrating straight fruit juice. Also, a cloudy fruit juice or a clear fruit juice may be used.

In the alcoholic beverage of the present invention, two or more types of fruit juices may be used. The amounts of fruit juices to be combined are not particularly limited. With regard to the types of fruit juices, the fruit juices can be of any forms, including a straight fruit juice used as freshly squeezed from a fruit, or a concentrated fruit juice obtained by concentrating straight fruit juice. Also, cloudy fruit juices or clear fruit juices may be used.

In a preferred embodiment, the alcoholic beverage of the present invention has a pH of from 2.3 to 4.5, more preferably from 2.8 to 4.3, still more preferably from 3.3 to 4.1. By adjusting pH to lie in such a range, a beverage particularly excellent in palatability can be obtained. If the beverage has a pH of less than 2.3, low pH may affect the taste of the beverage. If the beverage has a pH exceeding 4.5, the beverage may taste somewhat harsh.

The procedure for adjusting the pH of the beverage is not particularly limited, and the pH of the beverage can be adjusted using an agent commonly used for beverage pH adjustment, such as citric acid or trisodium citrate. Also, the pH of the beverage may be adjusted through adjustment of the contents of other components (e.g., fruit juice).

The pH of the beverage can be measured using a commercially available pH meter. During the process of beverage pH measurement, the beverage, when containing carbon dioxide gas, is subjected to degassing before measurement. The degassing procedure is not particularly limited, and carbon dioxide gas can be degassed by a common procedure such as sonication, aeration, or vacuum deaeration.

The acidity of the beverage of the present invention is adjusted to be in the range of preferably from 0.05 to 0.60 g/100 mL, more preferably from 0.10 to 0.50 g/100 mL, still more preferably from 0.15 to 0.45 g/100 mL, in terms of citric acid. By adjusting acidity to lie in such a range, a particularly easy-to-drink beverage with a moderately acidic taste can be obtained. The acidity of the beverage can be measured by a common titration method.

Examples of acidulants include, but are not limited to, different acids such as citric acid, succinic acid, lactic acid, malic acid, tartaric acid, gluconic acid, and phosphoric acid, or salts thereof. The amount of acidulant used is not uniquely determined and varies with the type of acidulant used and the like, but is typically in the range of from 0.01 to 5 mass %, preferably from 0.05 to 0.5 mass %, based on the amount of the beverage.

The beverage of the present invention may contain a sugar including glucose. Also, the beverage of this invention may contain one or more types of natural or artificial sweeteners.

In a preferred embodiment, the beverage of the present invention has a Brix value of not more than 10, preferably from 0.1 to 9, or may have a Brix of from 0.2 to 5. The concentration of soluble solids in solution can be evaluated by means of Brix values determined using a sugar content meter, refractometer, etc. The Brix is a value obtained by converting a refractive index measured at 20° C. into a mass/mass percentage of sucrose in solution based on the conversion table published by ICUMSA (the International Commission for Uniform Methods of Sugar Analysis). The Brix is expressed in unit of "Bx", "%" or "degree".

The beverage of the present invention may also be a low-solute beverage with a low concentration of soluble solids in solution—thus, the beverage of this invention includes so-called low-calorie beverages labeled as "sugar-free", "saccharide-free", "low-calorie" or the like. The labelings as "sugar-free". "saccharide-free". "low-calorie" or the like are defined in the nutrition labeling standards as stipulated under the health promotion act. For example, the label as "sugar-free" is placed on beverages whose content of a sugar (which is a monosaccharide or disaccharide, and is not a sugar alcohol) is less than 0.5 g per 100 g of beverage. The label as "saccharide-free" is placed on beverages with a saccharide concentration of less than 0.5 g/100 mL. The "saccharide" is a type of carbohydrate which is one of the three major nutrients, and is a generic name for available carbohydrates calculated by subtracting dietary fiber content from total carbohydrates.

Similarly to common beverages, the alcoholic beverage of the present invention can be made into a packaged beverage through sterilization and other steps. For example, a sterilized packaged beverage can be produced by a method that involves performing heat sterilization by hot water shower or the like after a beverage is packed in a package, or a method that involves subjecting a beverage to heat sterilization followed by packaging. Also, an unheated packaged beverage can be produced without a heat sterilization step. As referred to in this invention, the term "unheated" means that no heating step is involved after the step of mixing source ingredients, regardless of whether a heating step is performed during the process of preparing source ingredients.

In one embodiment, the present invention can also be understood to be directed to a method for producing an alcoholic beverage. The method for producing an alcoholic beverage according to this invention comprises the step of adding a specified amount of *Yucca* saponin and a specified amount of alcohol. The method for producing a packaged beverage comprises at least the step of packing a prepared beverage in a package.

The beverage of the present invention can be produced using a conventionally known method. Any skilled artisan can design, as appropriate, the conditions for a component mixing step, an optional sterilization step, and a packaging step.

In another embodiment, the present invention can also be understood to be directed to a method for reducing a sensation of pungency in a packaged alcoholic beverage, the method comprising the step of adding a specified amount of *Yucca* saponin.

EXAMPLES

Hereunder, the present invention will be described in more detail by way of specific experimental examples, but this invention is not limited to the specific examples given below. Unless otherwise stated herein, all concentrations and other like parameters are expressed on a mass basis, and all numerical ranges are inclusive of their endpoints.

Experiment 1: Production and Evaluation of Packaged Alcoholic Beverages

Different packaged alcoholic beverages with an alcohol content of 5 v/v % were produced and evaluated based on the table given below.

To be specific, an alcohol (neutral spirits; alcohol content: 59 v/v %), an acidulant (citric acid, malic acid, or lactic acid), and a *Yucca* extract (SARAKEEP PE, produced by Maruzen Pharmaceuticals Co., Ltd.) were sequentially added to pure water to prepare alcoholic beverages. The prepared alcoholic beverages wee packed in packages to give unheated packaged alcoholic beverages which were not subjected to heat sterilization.

In this experiment, an acidulant was added to the beverages to a concentration of 0.3%(3000 ppm). SARAKEEP PE as a *Yucca* extract (produced by Maruzen Pharmaceuticals Co., Ltd.; *Yucca* saponin content: about 1.5%) was added to the beverage to give such different *Yucca* saponin contents as shown in the table given below. The obtained packaged alcoholic beverages had a pH of about 2.5, a Brix value of about 0.3, and an acidity of about 0.3 g/100 mL (in terms of citric acid).

The obtained beverage samples were subjected to sensory evaluation by four professional panelists to determine their sensation of pungency and aroma. The beverage samples were rated according to the eight-point grading scale detailed below, with Sample No. 1-1 being used as a control. The final ratings were determined through mutual agreement among the four professional panelists.
(Piquant Pungency)
- −8 points: The sensation of pungency is the same as that of the control.
- −6 points: The sensation of pungency is somewhat reduced as compared to that of the control.
- −4 points: The sensation of pungency is reduced as compared to that of the control.
- −2 points: The sensation of pungency is significantly reduced as compared to that of the control.

(Clean Aroma)
- 8 points: The clean aroma is the same as that of the control.
- 6 points: The clean aroma is somewhat deteriorated as compared to that of the control.
- 4 points: The clean aroma is deteriorated as compared to that of the control.
- 2 points: The clean aroma is significantly deteriorated as compared to that of the control.

TABLE 1

Experiment 1: Production and preparation of alcoholic beverages (alcohol content: 5%)

| | Sample | | | | | |
|---|---|---|---|---|---|---|
| | 1-1 (Control) | 1-2 | 1-3 | 1-4 | 1-5 (Com. Ex.) | 1-6 | 1-7 |
| Yucca saponin | 0 ppm | 1.5 ppm | 7.5 ppm | 15 ppm | 75 ppm | 7.5 ppm | 7.5 ppm |
| Acidulant (0.3%) | Citric acid | Citric acid | Citric acid | Citric acid | Citric acid | Malic acid | Lactic acid |
| Piquant pungency | −8 | −7 | −4 | −3 | −2 | −4 | −4 |
| Clean aroma | 8 | 8 | 7 | 6 | 1 | 7 | 7 |

The results in Table 1 revealed that, by adding a small amount of a *Yucca* extract to packaged alcoholic beverages, a sensation of piquant pungency derived from an alcohol was alleviated successfully while the beverages were allowed to retain their clean aroma. Also, it was found that according to the present invention, alcoholic beverages with excellent aroma profiles were produced successfully even using malic acid or lactic acid as an acidulant (Sample Nos. 1-6 and 1-7).

Experiment 2: Production and Evaluation of Packaged Alcoholic Beverages

Different packaged carbonated alcoholic beverages with an alcohol content of 8.5 v/v % were produced and evaluated based on the table given below ($CO_2$ gas pressure: 1.5 kgf/cm$^2$).

To be specific, an alcohol (neutral spirits, alcohol content: 59 v/v %), an acidulant (citric acid), a *Yucca* extract (SARA-KEEP PE, produced by Maruzen Pharmaceuticals Co., Ltd.), and a citrus flavoring (D-limonene, produced by Nacalai Tesque, Inc.) were sequentially added to pure water and mixed with carbonic water to prepare unheated packaged alcoholic beverages which were not subjected to heat sterilization. In this experiment, the acidulant citric acid and the citrus flavoring limonene were added to the beverages to concentrations of 0.3% (3000 ppm) and 15 ppm, respectively. The beverages had a pH of about 2.5, a Brix value of about 0.3, and an acidity of about 0.3 g/100 mL (in terms of citric acid).

The obtained beverage samples were subjected to sensory evaluation by following the same procedure as in Experiment 1 except that Sample No. 2-1 was used as a control.

TABLE 2

Experiment 2: Production and evaluation of alcoholic beverages (alcohol content: 8.5%, $CO_2$ pressure: 1.5 kgf/cm$^2$)

| Sample | 2-1 (Control) | 1-2 | 2-3 | 2-4 | 2-5 (Com. Ex.) |
|---|---|---|---|---|---|
| Yucca saponin | 0 ppm | 1.5 ppm | 7.5 ppm | 15 ppm | 75 ppm |
| Piquant pungency | −8 | −6 | −4 | −2 | −1 |
| Clean aroma | 8 | 8 | 8 | 7 | 1 |

As evident from the above table, it was found that, by adding a small amount of *Yucca* saponin even to packaged shochu-based cocktail beverages containing a flavoring, a sensation of piquant pungency derived from an alcohol was alleviated successfully while the beverages were allowed to retain their clean aroma.

Experiment 3: Production and Evaluation of Packaged Alcoholic Beverages

Different packaged carbonated alcoholic beverages with an alcohol content of 9.2 v/v % and a fruit juice content of 3% (in terms of straight fruit juice) were produced and evaluated based on the table given below ($CO_2$ gas pressure: 1.9 kgf/cm$^2$).

To be specific, an alcohol (neutral spirits; alcohol content: 59 v/v %), an acidulant (citric acid), a *Yucca* extract (SARA-KEEP PE, produced by Maruzen Pharmaceuticals Co., Ltd.), lemon juice (concentrated to 7-fold), a citrus flavoring, and sweeteners were sequentially added to pure water and mixed with carbonic water to prepare unheated packaged alcoholic beverages which were not subjected to heat sterilization. In this experiment, the acidulant citric acid, the sweeteners sucralose and acesulfame-K, and a citrus flavoring were added to the beverages to concentrations of 0.3% (3000 ppm), 0.01%, 0.001%, and 0.13%, respectively. The beverages had a pH of about 3.6, a Brix value of about 3.9, and an acidity of about 0.4 g/100 mL (in terms of citric acid).

The obtained beverage samples were subjected to sensory evaluation by following the same procedure as in Experiment 1 except that Sample No. 3-1 was used as a control.

TABLE 3

Experiment 3: Production and evaluation of alcoholic beverages (alcohol content: 9.2%, $CO_2$ pressure: 1.9 $kgf/cm^2$, fruit juice content: 3%)

| Sample | 3-1 (Control) | 3-2 | 3-3 | 3-4 | 3-5 (Com. Ex.) |
|---|---|---|---|---|---|
| Yucca saponin | 0 ppm | 1.5 ppm | 7.5 ppm | 15 ppm | 75 ppm |
| Piquant pungency | −8 | −5 | −4 | −2 | −1 |
| Clean taste | 8 | 8 | 8 | 7 | 2 |

As evident from the above table, it was found that, by adding a small amount of *Yucca* saponin even to packaged shochu-based cocktail beverages containing a fruit juice, a sensation of piquant pungency derived from an alcohol was alleviated successfully while the beverages were allowed to retain their clean aroma.

The invention claimed is:

1. A packaged alcoholic beverage comprising a *Yucca* extract, wherein the beverage has a *Yucca* saponin content of from 1.0 to 15 ppm and an alcohol content of from 1 to 9.5 v/v %,
wherein the alcoholic beverage comprises; a distilled liquor, and at least one selected from the group consisting of citric acid, sodium citrate, malic acid, and lactic acid,
wherein the packaged alcoholic beverage is unheated.

2. A method for producing a packaged alcoholic beverage, the method comprising:
providing an alcoholic beverage having a *Yucca* saponin content of from 1.0 to 15 ppm and an alcohol content of from 1 to 9.5 v/v %, wherein the alcoholic beverage comprises; a distilled liquor, and at least one selected from the group consisting of citric acid, sodium citrate, malic acid, and lactic acid; and
packing the alcoholic beverage in a package,
wherein the packed alcoholic beverage is unheated,
wherein the packaged alcoholic beverage has a reduced sensation of piquant pungency and retains clean aroma.

3. A method for reducing a sensation of alcohol pungency in a packaged alcoholic beverage, the method comprising:
providing an alcoholic beverage having an alcohol content of from 1 to 9.5 v/v %; and
adding a *Yucca* extract to the alcoholic beverage at a *Yucca* saponin content of from 1.0 to 15 ppm.

4. The beverage according to claim 1, wherein the *Yucca* saponin content is from 1.0 to 7.5 ppm.

5. The beverage according to claim 1, wherein the *Yucca* saponin content is from 1.0 to 1.5 ppm.

6. The beverage according to claim 1, wherein the beverage is a citrus alcoholic beverage.

7. The beverage according to claim 1, wherein the alcohol content is from 2.0 to 9.2 v/v %.

8. The beverage according to claim 1, wherein the alcohol content is from 3.0 to 8.9 v/v %.

9. The beverage according to claim 1, wherein the packaged alcoholic beverage has a reduced sensation of piquant pungency and retains clean aroma.

10. The method according to claim 1, wherein the packaged alcoholic beverage has a reduced sensation of piquant pungency and retains clean aroma.

11. The beverage according to claim 1, wherein the alcoholic beverage consists essentially of the distilled liquor, and said at least one.

12. The method according to claim 1, wherein the alcoholic beverage consists essentially of the distilled liquor, and said at least one.

\* \* \* \* \*